(12) United States Patent
Handshaw et al.

(10) Patent No.: US 8,991,705 B2
(45) Date of Patent: Mar. 31, 2015

(54) APPARATUS FOR, AND METHOD OF, ELECTRO-OPTICALLY READING TARGETS BY ENABLING A CUSTOMER TO MOVE A CUSTOMER-OPERATED ACCESSORY READER SUPPORTED BY A CLERK-OPERATED WORKSTATION OF A CHECKOUT SYSTEM

(71) Applicant: Symbol Technologies, Inc., Schaumburg, IL (US)

(72) Inventors: Darran M. Handshaw, Sound Beach, NY (US); Mark E. Drzymala, St. James, NY (US); Joseph D. Giordano, Bayville, NY (US); Sean D. Marvel, Hampton Bays, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 15 days.

(21) Appl. No.: 13/795,876

(22) Filed: Mar. 12, 2013

(65) Prior Publication Data

US 2014/0263644 A1    Sep. 18, 2014

(51) Int. Cl.
*G06K 7/00*   (2006.01)
*G06K 7/10*   (2006.01)
*G06K 7/14*   (2006.01)
*G07G 1/00*   (2006.01)

(52) U.S. Cl.
CPC .......... *G06K 7/10801* (2013.01); *G07G 1/0018* (2013.10); *G07G 1/0045* (2013.01); *G06K 7/1096* (2013.01)
USPC .......... 235/440; 235/435; 235/439; 235/454; 235/462.01; 235/462.14; 235/462.17; 235/462.32; 235/462.43

(58) Field of Classification Search
CPC ................... G05K 7/1096; G06K 7/0004
USPC .......... 235/435, 439, 440, 454, 462.01, 235/462.14, 462.17, 462.32, 462.43
See application file for complete search history.

(56) References Cited

U.S. PATENT DOCUMENTS

| | | | |
|---|---|---|---|
| 4,939,356 A * | 7/1990 | Rando et al. | 235/462.2 |
| 5,151,581 A * | 9/1992 | Krichever et al. | 235/454 |
| 5,448,046 A * | 9/1995 | Swartz | 235/432 |
| 7,070,109 B2 | 7/2006 | Kato et al. | |
| 7,097,101 B2 | 8/2006 | Kogan et al. | |
| 7,243,850 B2 * | 7/2007 | Tamburrini et al. | 235/462.45 |
| 7,318,552 B2 | 1/2008 | Nuebling | |
| 7,746,511 B2 | 6/2010 | Hamilton et al. | |
| 8,191,786 B2 | 6/2012 | Huang et al. | |
| 2003/0071127 A1 | 4/2003 | Bryant et al. | |
| 2006/0038009 A1* | 2/2006 | Russell et al. | 235/383 |
| 2009/0212184 A1* | 8/2009 | Bourgeois et al. | 248/288.11 |
| 2012/0042600 A1* | 2/2012 | Bacon | 52/632 |
| 2012/0325913 A1* | 12/2012 | Collins et al. | 235/462.07 |
| 2013/0015242 A1* | 1/2013 | White | 235/383 |
| 2013/0306727 A1* | 11/2013 | Shearin et al. | 235/440 |

* cited by examiner

*Primary Examiner* — Thien M Le
*Assistant Examiner* — Claude J Brown
(74) *Attorney, Agent, or Firm* — Nong-Qiang Fan

(57) ABSTRACT

A checkout system includes a clerk-operated, bi-optical workstation through which products associated with targets having target data to be electro-optically captured are passed, and a customer-operated, accessory reader having an accessory window and a data capture assembly for capturing additional target data of additional targets associated with transaction-related items. The accessory reader is supported by the workstation for movement relative to the workstation to enable the customer to readily position and aim the accessory window at the additional targets.

18 Claims, 6 Drawing Sheets

APPARATUS FOR, AND METHOD OF, ELECTRO-OPTICALLY READING TARGETS BY ENABLING A CUSTOMER TO MOVE A CUSTOMER-OPERATED ACCESSORY READER SUPPORTED BY A CLERK-OPERATED WORKSTATION OF A CHECKOUT SYSTEM

FIELD OF THE DISCLOSURE

The present disclosure relates generally to a point-of-transaction checkout system having a clerk-operated workstation for electro-optically reading targets associated with products passing through the workstation, and a customer-operated accessory reader supported by the workstation and operative for electro-optically reading additional targets associated with transaction-related items, and, more particularly, to an apparatus for, and a method of, reading the additional targets by enabling the customer to positionally move the accessory reader relative to the workstation.

BACKGROUND

In the retail industry, horizontal or flat bed slot scanners, each having a single horizontal window; vertical slot scanners, each having a single upright or vertical window; and bi-optical scanners, each having both a horizontal window and an upright window, have been used to electro-optically read targets, such as one-dimensional bar code symbols, particularly of the Universal Product Code (UPC) type, and two-dimensional bar code symbols, such as PDF417 and QR codes, at full-service, point-of-transaction checkout systems operated by checkout clerks in supermarkets, warehouse clubs, department stores, and other kinds of retailers, for many years. Products to be purchased, or their packaging, bear identifying symbol targets and are typically slid by a clerk across a respective window, e.g., from right to left, or from left to right, in a "swipe" mode, to a bagging area. Alternatively, the clerk merely presents each symbol target on each product to, and holds each product momentarily steady at, a central region of a respective window in a "presentation" mode, prior to placing each product in the bagging area. The choice depends on the type of target, on clerk preference, and on the layout of the system.

Some checkout systems are laser-based workstations, and project a multitude of laser scan lines through a respective window. When at least one of the scan lines sweeps over a symbol target associated with a product, the symbol target is processed, decoded and read. The multitude of scan lines is typically generated by a scan pattern generator which includes a laser for emitting a laser beam at a mirrored component mounted on a shaft for rotation by a motor about an axis. A plurality of stationary mirrors is arranged about the axis. As the mirrored component turns, the laser beam is successively reflected onto the stationary mirrors for reflection therefrom through the respective window as a scan pattern of the laser scan lines.

Other checkout systems are imager-based workstations, and have one or more solid-state imagers, or image sensors, analogous to those conventionally used in consumer digital cameras. Each imager has a one- or two-dimensional array of photocells or light sensors (also known as pixels), and an imaging lens assembly for capturing return light scattered and/or reflected from a target being imaged through a respective window over a field of view, and for projecting the return light onto the sensor array to initiate capture of an image of the target over a range of working distances in which the target can be read. The target may be a symbol target, as described above, either printed on a label or displayed on a display screen of an electronic device, such as a smart phone. The target may also be a non-symbol target, such as a form, a document, a label, a receipt, a signature, a driver's license, an employee badge, a payment/loyalty card, etc., each bearing alphanumeric characters, as well as, in some cases, a picture, to be imaged. Such an imager may include a one- or two-dimensional charge coupled device (CCD) or a complementary metal oxide semiconductor (CMOS) device and associated circuits for producing and processing electrical signals corresponding to a one- or two-dimensional array of pixel data over the field of view. These electrical signals are decoded and/or processed by a programmed microprocessor or controller into data related to the target being electro-optically read, e.g., decoded data indicative of a symbol target, or into a picture of a target other than a symbol target.

All of the above-described checkout workstations are typically operated by checkout clerks who pass the products through the workstations to the bagging areas for bagging and customer retrieval. In an effort to reduce, if not eliminate, the need for checkout clerks and their associated labor cost, and to improve the speed and efficiency of the checkout operation, a number of self-service, point-of-sale, checkout systems operated by the customers without the aid of the checkout clerks have been proposed. During operation of a self-service checkout system, a customer retrieves the individual products for purchase from a shopping cart or basket and/or from an entrance conveyor belt at a countertop, and moves the retrieved individual products across, or presents the individual products to, a workstation window to read their respective symbol targets, and then places the read products onto an exit conveyor belt at the countertop for delivery to the bagging area, for packing in carry-out bags. The customer then pays for his or her purchases either at the self-service checkout system if so equipped with a credit/debit card reader, or at a central payment area that is staffed by a store employee. Thus, the self-service checkout system permits the customer to select, itemize, and, in some cases, pay for his or her purchases, without the assistance of the retailer's personnel.

However, self-service is not readily available if the aforementioned and increasingly popular, bi-optical workstation is installed at a checkout system. The upright window faces the clerk, not the customer. A rear wall of the bi-optical workstation rises from the countertop and faces the customer. As a result, the customer does not have ready access to either window of the bi-optical workstation and cannot assist in the checkout procedure, even if the customer wanted to, because the rear wall blocks such access. This lack of self-service potentially causes such bi-optical workstations to go unused or underutilized, and their expense to be economically unjustified. Bi-optical workstations occupy valuable real estate in a retailer's operation, which might otherwise be used for self-service systems.

In order to have the customer participate in the checkout procedure despite the presence of the bi-optical workstation, it has been proposed to install a supplemental, auxiliary or accessory reader having an accessory window at the checkout system. This accessory reader is independently operated by the customer. For example, this accessory reader can be used to read any symbol target, such as a printed code, or an electronic code electronically displayed on a screen of a communications device, e.g., a smartphone, or a non-coded target, independently of the assistance of the clerk, on any item related to the transaction. These transaction-related items might be loyalty cards, identification cards, coupons, smartphones, and even countertop merchandise bought on impulse.

For such reasons, among others, as privacy, hygiene, and security, many customers do not wish to hand over identification cards, such as drivers' licenses containing age data, to the clerk, and would instead prefer to operate the accessory reader. Due to the increasing popularity of coupons being delivered over smartphones, and thus the increased likelihood that the customer's smartphone will be handled during checkout, many retailers also prefer that the customer operate the accessory reader out of concern for legal liability in the event that the clerk accidentally drops the customer's smartphone.

However, as advantageous as the use of such accessory readers in combination with a bi-optical workstation has been, one concern relates to a lack of freedom of movement of the accessory reader. The accessory reader is typically stationarily built into the bi-optical workstation, such that the position of its accessory window is fixed. Some items are too heavy, or too large, or too bulky to be easily positioned in front of the fixed accessory window. In an effort to more readily effect such positioning, it is known to plug a corded accessory reader into the workstation with a cable. However, the cable has a fixed length and limits the freedom of movement of the corded accessory reader. In some retail checkout systems, the available space is too cramped to readily position an item in front of a fixed accessory window, or to position an accessory window of a corded accessory reader having a fixed length cable to face an item.

Accordingly, there is a need to enable the accessory reader to be readily positionally movable by the customer relative to the workstation by which the accessory reader is supported, without being restricted by a fixed accessory window, or by a fixed length cable connected to the accessory reader.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
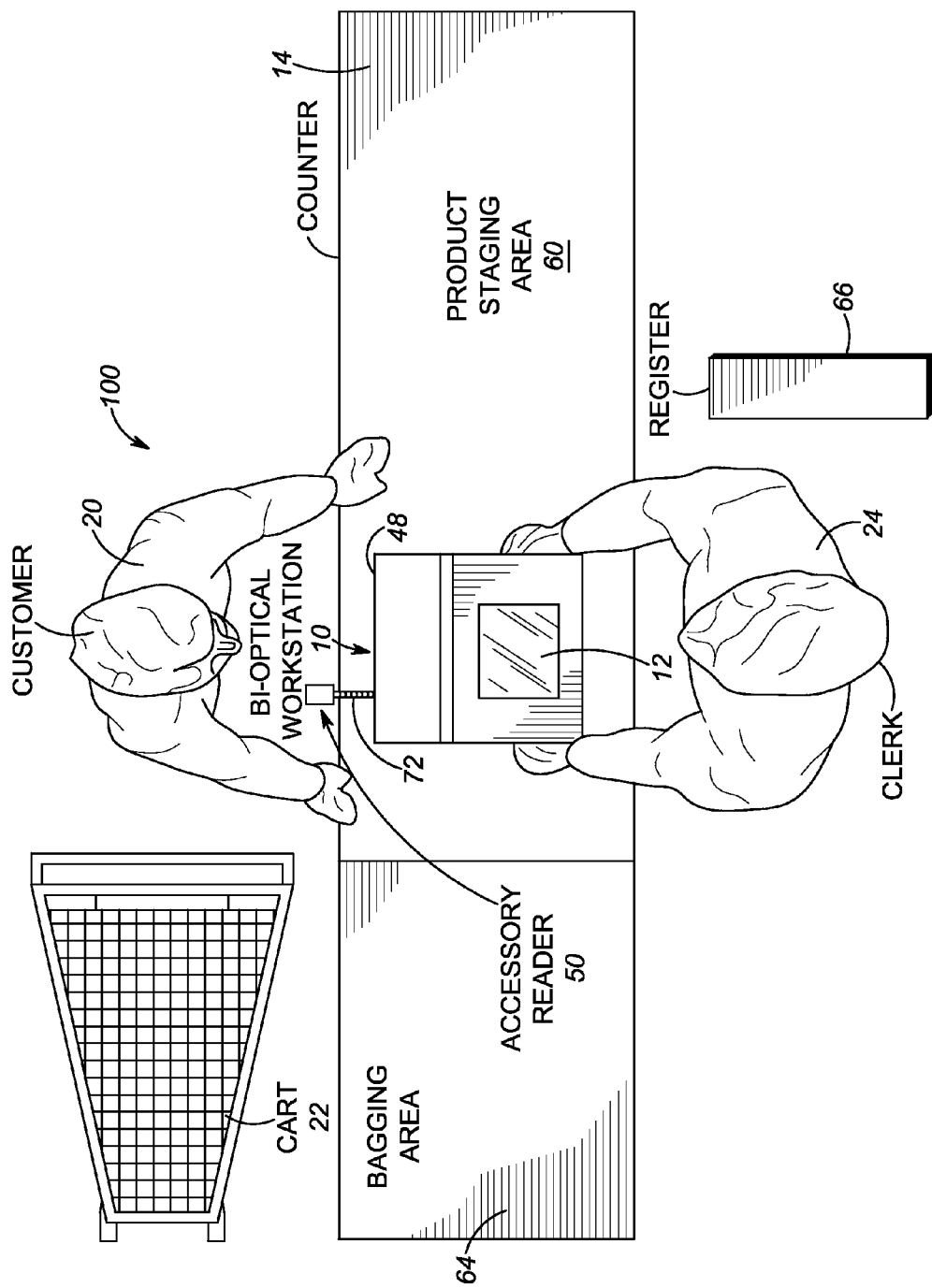
FIG. 1 is a top plan view of one embodiment of a checkout system for processing products associated with targets electro-optically readable by a clerk-operated workstation, and for processing transaction-related items associated with additional targets electro-optically readable by a movable, customer-operated, accessory reader supported by the workstation in accordance with this disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

One aspect of this disclosure relates to a checkout system comprising a bi-optical workstation that is operated by a clerk, and an accessory reader that is operated by a customer. The workstation has a first workstation window located in a generally horizontal plane, and a second workstation window located in a generally upright plane that intersects the generally horizontal plane. Both of the workstation windows face and are accessible to the clerk for enabling the clerk to pass products to be checked out in a transaction through the workstation. The workstation has a data capture arrangement for capturing through at least one of the workstation windows target data of targets associated with the products to be checked out by the clerk. Advantageously, the data capture arrangement at the workstation includes at least one solid-state workstation imager for capturing through at least one of the workstation windows an image of the target data, and a workstation microprocessor operatively connected to the at least one imager for processing the image of the target data.

The accessory reader has an accessory window and a data capture assembly for capturing through the accessory window additional target data of additional targets associated with items related to the transaction. Advantageously, the data capture assembly at the accessory reader includes at least one solid-state accessory imager for capturing through the accessory window an image of the additional target data over a range of working distances; and an accessory microprocessor operatively connected to the accessory imager for processing the image of the additional target data. In some cases, the workstation microprocessor and the accessory microprocessor are one and the same.

In accordance with this disclosure, the accessory reader is supported by the workstation for movement relative to the workstation to enable the customer to readily position, move, and aim the accessory window at the additional targets. Thus, the customer's operation of the accessory reader is no longer restricted, as in the prior art, by a fixed accessory window, or by a fixed length cable connected to the accessory reader.

In one embodiment, the accessory reader is rearwardly mounted on the workstation with an elongated, jointed, hollow, flexible arm that is bendable into a curved shape, and that maintains its curved shape until bent again. In another embodiment, the accessory reader is rearwardly pivotally mounted on the workstation with an elongated, rigid arm for pivoting movement about an upright axis. In still another embodiment, the accessory reader is rearwardly mounted on the workstation with an elongated, telescoping arm for linear movement toward and away from a rear of the workstation. In yet another embodiment, the accessory reader is rearwardly mounted in the workstation for turning movement about an upright axis, preferably with the aid of a handle, and a plurality of detents are arranged in an arc around the upright axis, and operative for locking the accessory reader in a selected one of the detents.

Another aspect of this disclosure relates to a checkout method, which is performed by configuring a bi-optical workstation with a first workstation window located in a generally horizontal plane, and with a second workstation window located in a generally upright plane that intersects the generally horizontal plane; by positioning the workstation windows to face and be accessible to a clerk to enable the clerk to interact and operate the workstation; by capturing through at least one of the workstation windows target data of targets associated with products to be checked out by the clerk in a transaction, by passing the products through the workstation; by configuring an accessory reader with an accessory window; by enabling a customer to interact with and operate the accessory reader; by capturing through the accessory window additional target data of additional targets associated with items related to the transaction; and by supporting the accessory reader by the workstation for movement relative to the workstation to enable the customer to readily position and aim the accessory window at the additional target.

Figure 2:
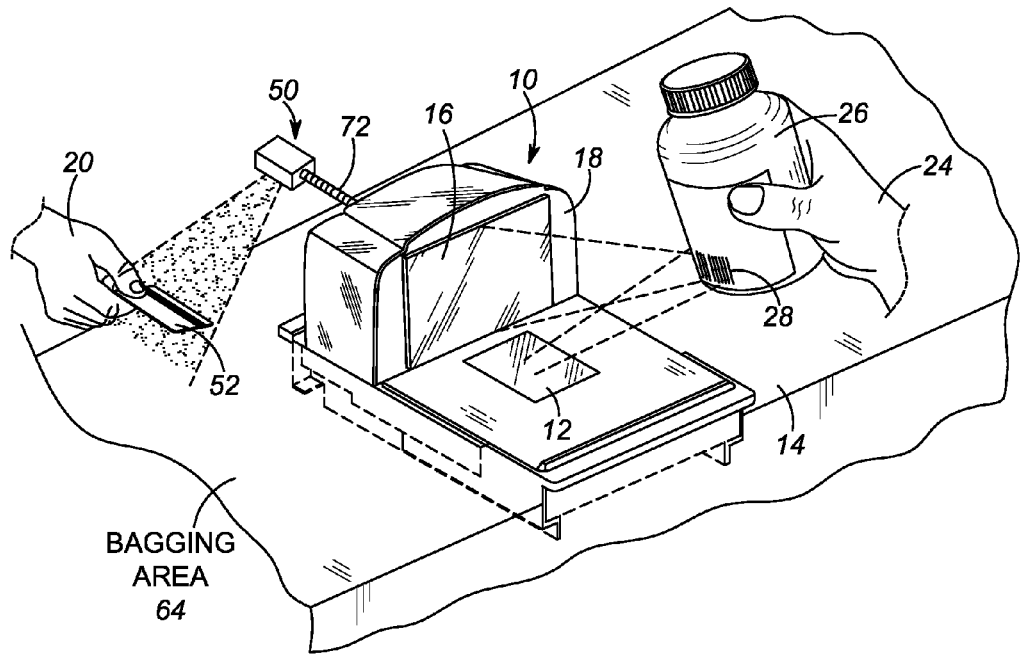
FIG. 2 is a broken-away, front and side, perspective view of the embodiment of FIG. 1 during reading.
Figure 3:
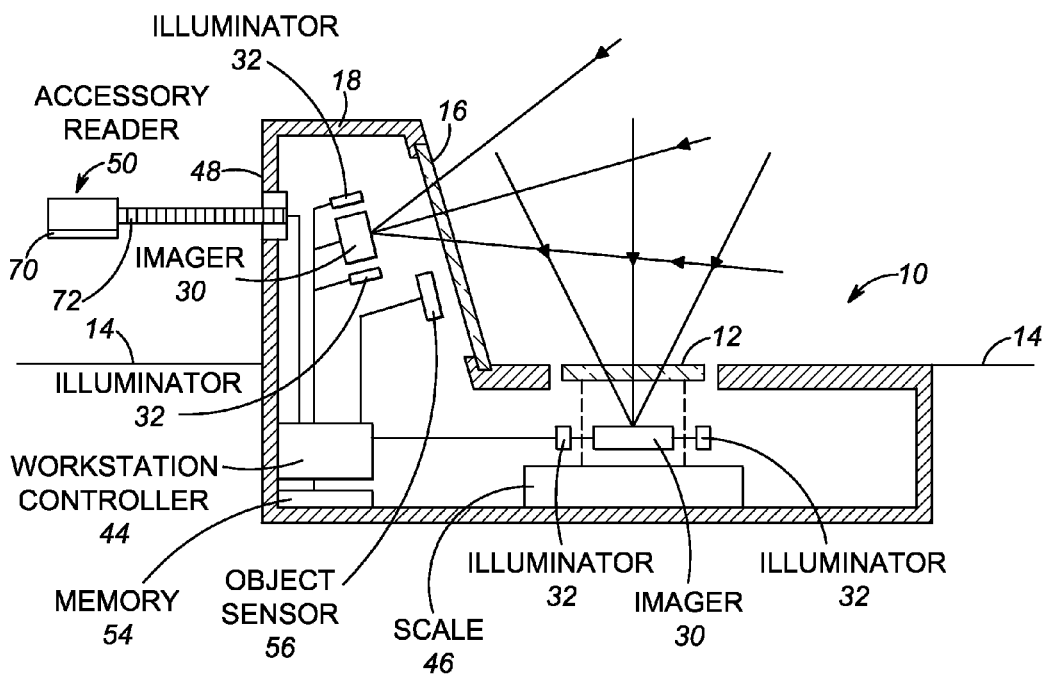
FIG. 3 is a schematic diagram of various components of the embodiment of FIG. 1.

Turning now to the drawings, a checkout system 100, as depicted in FIG. 1, includes a dual window, bi-optical, point-of-transaction workstation 10 used by retailers at a checkout counter to process transactions involving the purchase of products 26 (see FIG. 2) bearing, or associated with, an identifying target, such as the UPC symbol 28 described above. As best seen in FIGS. 2-3, the workstation 10 has a generally horizontal planar window 12 elevated, or set flush with, a countertop 14, and a vertical or generally vertical, i.e., tilted, (referred to as "upright" hereinafter) planar window 16 set flush with, or recessed into, a raised housing portion 18 above the countertop 14. The workstation 10 either rests directly on the countertop 14, or rests in a well formed in the countertop 14. The raised housing portion 18 has a rear wall 48.

Returning to FIG. 1, both of the windows 12, 16 are positioned to face and be accessible to a clerk 24 standing at one side of the counter for enabling the clerk 24 to interact with the workstation 10, and with a cash register 66 to enable the clerk to receive payment for the purchased products. The register 66 may include a debit/credit card reader and a receipt printer to print a receipt. A keypad may also be provided at the register 66 to enable manual entry of information, such as an identifying code for any purchased product not bearing a symbol, by the clerk 24.

A product staging area 60 is located on the countertop 14 at one side of the workstation 10. The products 26 are typically placed on the product staging area 60 by a customer 20 standing at the opposite side of the counter. The customer 20 typically retrieves the individual products for purchase from a shopping cart 22 or basket for placement on the product staging area 60. A non-illustrated conveyor belt could be employed for conveying the products 26 to the clerk 24.

As previously described, the rear wall 48 of the bi-optical workstation 10 rose from the countertop 14 and faced the customer 20 in the prior art. As a result, the customer 20 did not have ready access to either window 12 or 16 of the bi-optical workstation 10 and could not assist in the checkout procedure, even if the customer 20 wanted to, because the rear wall 48 blocked such access. Thus, in order to have the customer 20 participate in the checkout procedure despite the presence of the bi-optical workstation 10, a supplemental, auxiliary or accessory reader 50 is provided at the checkout system 100.

This accessory reader 50 has an accessory window 70 and is supported by the workstation 10 for movement relative to the workstation to enable the customer 20 to readily position and aim the accessory window 70 at additional targets, as described below. This accessory reader 50 is independently operated by the customer 20. This accessory reader 50 can be used to read any additional target, such as a printed code, or an electronic code displayed by a smartphone, or a non-coded target, independently of the assistance of the clerk 24, associated with any item related to the transaction. These additional targets are provided on items 52 (see FIG. 2), such as loyalty cards, identification cards, drivers' licenses, coupons, smartphones, and even countertop merchandise bought on impulse. For reasons of privacy, hygiene, and security, many customers 20 do not wish to hand over identification cards, such as drivers' licenses containing age data, to the clerk 24, and would instead prefer to operate the accessory reader 50 themselves, and, indeed, many retailers prefer this, too, out of concern for legal liability in case the clerk 24 accidentally drops a smartphone.

As schematically shown in FIG. 3, a data capture arrangement, advantageously including a plurality of imaging readers, each including a solid-state workstation imager 30 and a pair of illuminators 32, is mounted at the workstation 10, for capturing light passing through either or both windows 12, 16 from a target 28 that can be a one- or two-dimensional symbol, such as a two-dimensional symbol on a driver's license, or any document. Each workstation imager 30 is a solid-state, one- or two-dimensional array, preferably a CCD or CMOS array. Each workstation imager 30 preferably has a global shutter. Each illuminator 32 is preferably one or more light sources, e.g., one or more surface-mounted, light emitting diodes (LEDs), located at each workstation imager 30 to uniformly illuminate the target 28.

In use, the clerk 24 processes each product 26 bearing a UPC symbol or target 28 thereon, past the windows 12, 16 by swiping the product 26 across a respective window, or by presenting the product 26 by holding it momentarily steady at the respective window, before passing the product 26 to a bagging area 64 that is located at the opposite side of the workstation 10. The target 28 may be located on any of the top, bottom, right, left, front and rear, sides of the product, and at least one, if not more, of the workstation imagers 30 will capture the illumination light reflected, scattered, or otherwise returning from the target through one or both windows as an image. FIG. 2 also schematically depicts that a weighing scale 46 can be mounted at the workstation 10. The generally horizontal window 12 advantageously serves not only as a weighing platter for supporting a product to be weighed, but also allows the return light to pass therethrough.

As also schematically shown in FIG. 3, an object sensor 56 is also mounted at the workstation 10 for detecting when each product 26 enters and exits the workstation 10. The object sensor 56 may advantageously include two pairs of infrared (IR) light emitting diode (LED) emitters and IR detectors. Each IR emitter directs IR light, which is invisible to the human eye, in a wavelength range from about 700 nm to about 1100 nm, over a viewing angle through the workstation window at the target 28 for return therefrom for detection by the IR detector for detecting return IR light returned from the target 28 over an object detection field of view. The viewing angle of each emitter is approximately equal to the object detection field of view of the IR detector for better system efficiency and pointing in the direction of the target. The object detection field of view substantially overlaps the reading field of view. The object sensor 56 need not be IR-based, but could instead be any motion or proximity sensor.

The workstation imagers 30, the associated illuminators 32, and the object sensor 56 are operatively connected to a programmed workstation microprocessor or controller 44 operative for controlling the operation of these and other components. Preferably, the workstation microprocessor 44 is tasked with processing the return light scattered from each target 28, and with decoding the captured target image of the return light. A memory 54 is operatively bidirectionally connected to the workstation microprocessor 44.

In operation, a reading mode for the workstation microprocessor 44 is initiated when the object sensor 56 detects that a product 26 has entered the workstation 10. The workstation microprocessor 44 then sends successive command signals to the illuminators 32 to pulse the LEDs for a short time period of 300 microseconds or less, and successively energizes the workstation imagers 30 to collect light from the target 28 only during said time period, also known as the exposure time period. By acquiring a target image during this brief time period, the image of the target 28 is not excessively blurred even in the presence of relative motion between the workstation imagers and the target. A typical array needs about 11 to 33 milliseconds to acquire the entire target image and operates at a frame rate of about 30 to 90 frames per second. The array may have on the order of one million addressable sensors. The reading mode ends when the object sensor 56 detects that the product 26 has exited the workstation 10, or when the workstation microprocessor 44 has successfully decoded the target 28.

The accessory reader 50 has an accessory window 70 and a data capture assembly for capturing additional target data of the additional target on each item 52 related to the transaction. Just like the data capture arrangement of the workstation 10 described above, the data capture assembly of the accessory reader 50 includes an image sensor or accessory imager and an imaging lens assembly mounted in front of the accessory imager operative for capturing light through the accessory window 70 from the additional target on the transaction-related item 52 located in a range of working distances as measured from the accessory window 70. In a preferred embodiment, the range begins at, or in the immediate vicinity of, the accessory window 70 (zero inches) and ends at the maximum working distance WD of about twelve inches from the accessory window 70. The data capture assembly of the accessory reader 50 may also include a controller or programmed accessory microprocessor operative for controlling the operation of the accessory imager, and may be tasked with processing and decoding the image from the additional target on item 52, or the accessory microprocessor may be tasked solely with acquiring the additional target data from the additional target on item 52, and for sending the acquired additional target data to the workstation microprocessor 44 (see FIG. 3), which then is responsible for processing and decoding the image from the additional target on item 52.

In use, the customer 20 processes each additional target on each transaction-related item 52 past the accessory window 70 by swiping the additional target on each transaction-related item 52 across the accessory window 70, or by presenting the additional target on each transaction-related item 52 by holding it momentarily steady at the accessory window 70.

In accordance with this disclosure, as noted above, the accessory reader 50 is supported by the workstation 10 for movement relative to the workstation 10 to enable the customer 20 to readily position, move, and aim the accessory window 70 at each additional target on each item 52. Thus, the customer's operation of the accessory reader 50 is no longer restricted, as in the prior art, by a fixed accessory window, or by a fixed length cable connected to the accessory reader.

Figure 4:
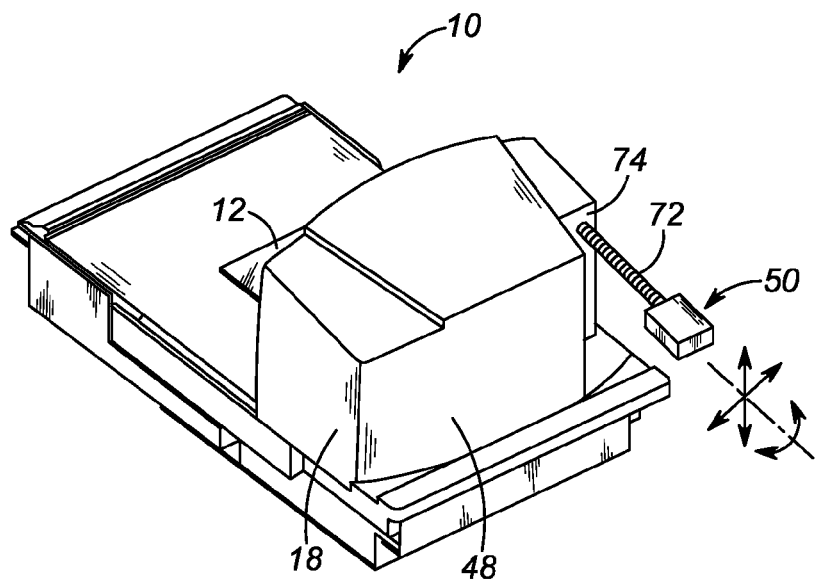
FIG. 4 is a rear perspective view of a modification of the embodiment of FIG. 1.

In one embodiment, as shown in FIGS. 1-3, the accessory reader 50 is rearwardly mounted on the rear wall 48 of the workstation 10 with an elongated, jointed, hollow, flexible arm 72 that is bendable into a curved shape, and that maintains its curved shape until bent again, in a manner similar to a gooseneck-style lamp. The flexible arm 72 in FIGS. 1-3 extends out from the rear wall 48 to enable the customer 20 to have ready physical access thereto. In a modification, as shown in FIG. 4, the flexible arm 72 is mounted in an alcove 74 at the rear of the workstation 10, so that the accessory reader 50 can be folded down and stowed in the alcove 74 when the accessory reader 50 is not being used. In FIGS. 1-4, the flexible arm 72 has multiple freedoms of movement, as indicated by the double-headed arrows.

Figure 5:
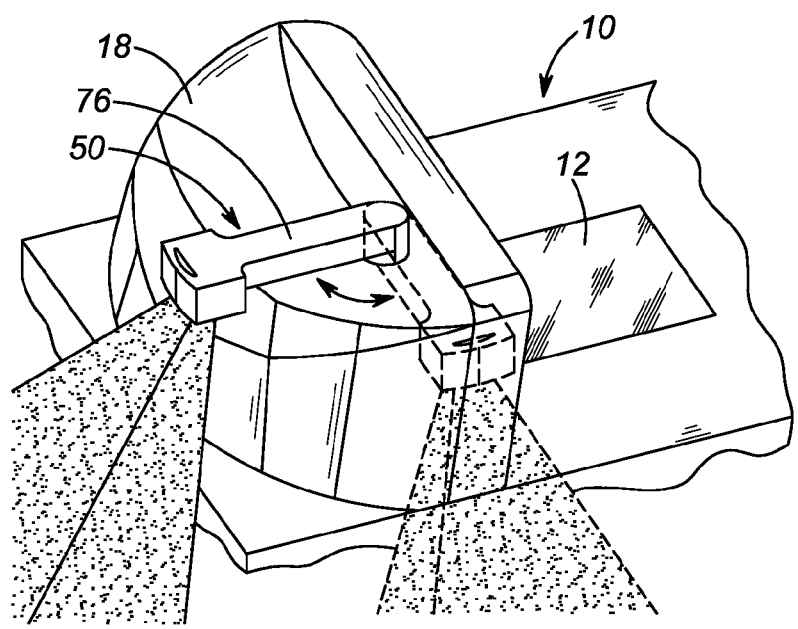
FIG. 5 is a broken-away, perspective view of another embodiment of a checkout system for processing products associated with targets electro-optically readable by a clerk-operated workstation, and for processing transaction-related items associated with additional targets electro-optically readable by a movable, customer-operated, accessory reader supported by the workstation in accordance with this disclosure.
Figure 6:
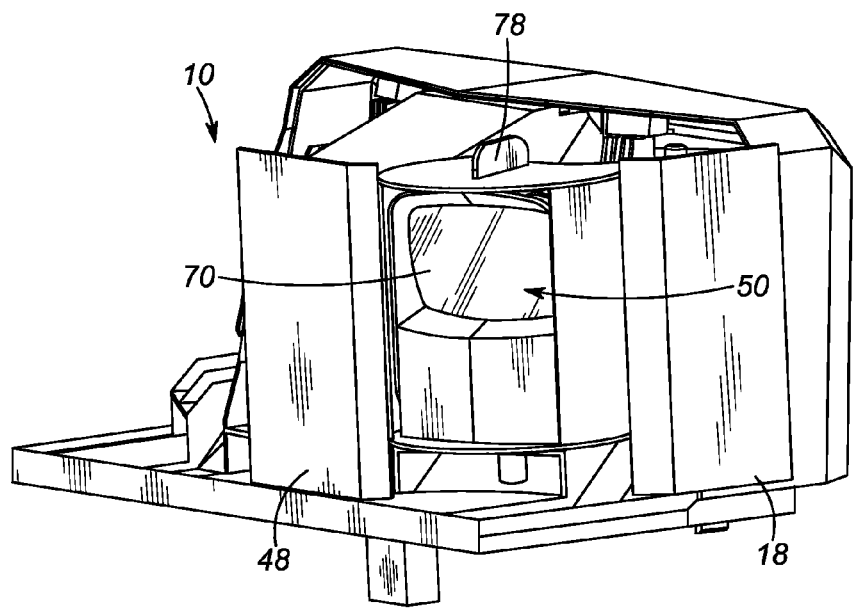
FIG. 6 is a broken-away, rear perspective view of still another embodiment of a checkout system for processing products associated with targets electro-optically readable by a clerk-operated workstation, and for processing transaction-related items associated with additional targets electro-optically readable by a movable, customer-operated, accessory reader supported by the workstation in accordance with this disclosure.
Figure 7:
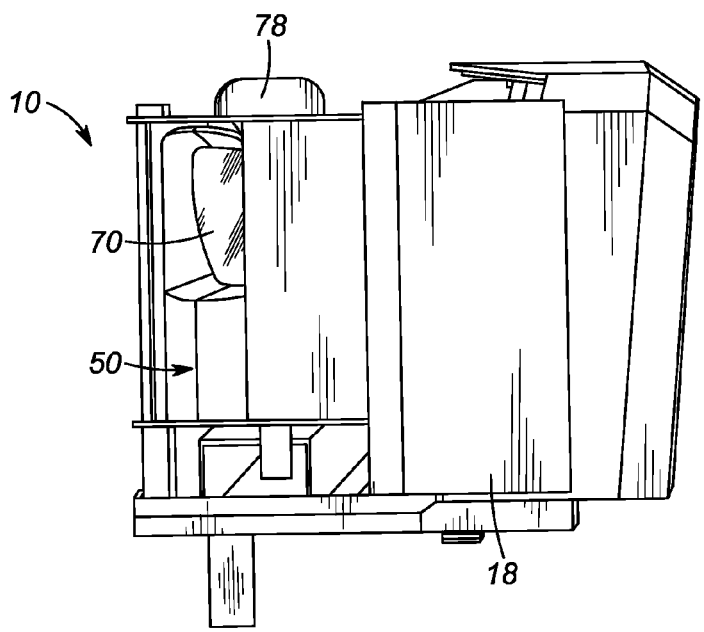
FIG. 7 is a side elevational view of the embodiment of FIG. 5.
Figure 8:
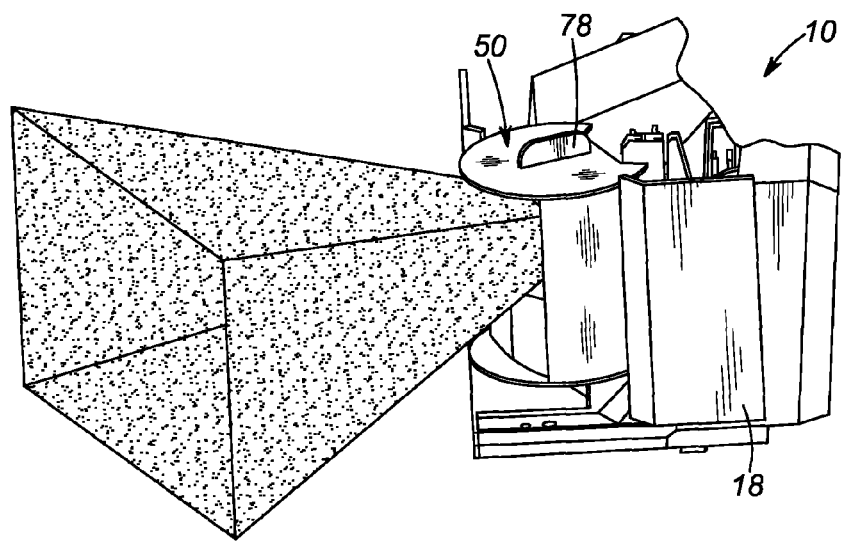
FIG. 8 is a broken-away, rear, top and side, perspective view of the embodiment of FIG. 5.

In another embodiment, as shown in FIG. 5, the accessory reader 50 is rearwardly pivotally mounted on a top wall of the workstation 10 with an elongated, rigid arm 76 for pivoting movement about an upright axis to any angular position between the solid-line and dashed-line positions, as indicated by the double-headed arrow. The speckled areas in FIG. 5 denote the field of view of the accessory imager in the accessory reader 50.

Figure 9:
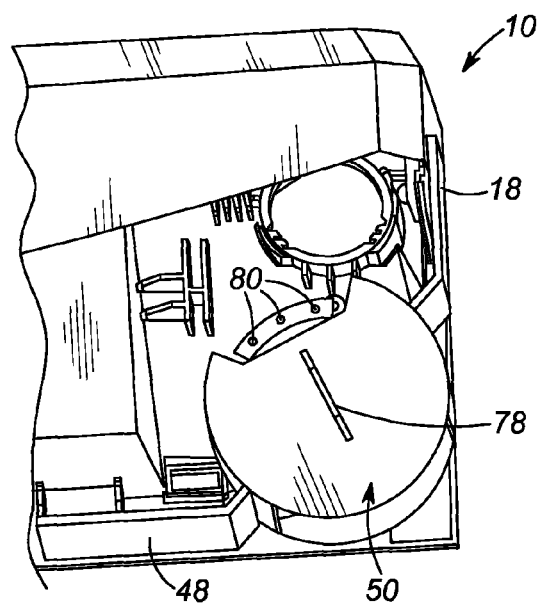
FIG. 9 is a broken-away, top plan view of the embodiment of FIG. 5.

In still another embodiment, as shown in FIGS. 6-9, the accessory reader 50 is configured as a cylindrical housing, which is rearwardly mounted in the workstation 10 for turning movement about an upright axis, preferably with the aid of a handle 78. Thus, the customer 20 can position the accessory window 70 to face each additional target. The speckled area in FIG. 8 denotes the field of view of the accessory imager in the accessory reader 50. As best seen in FIG. 9, a plurality of detents 80 are arranged in an arc around the upright axis, and are operative for locking the accessory reader 50 in a selected one of the detents 80 in a ratchet-type manner.

Figure 10:
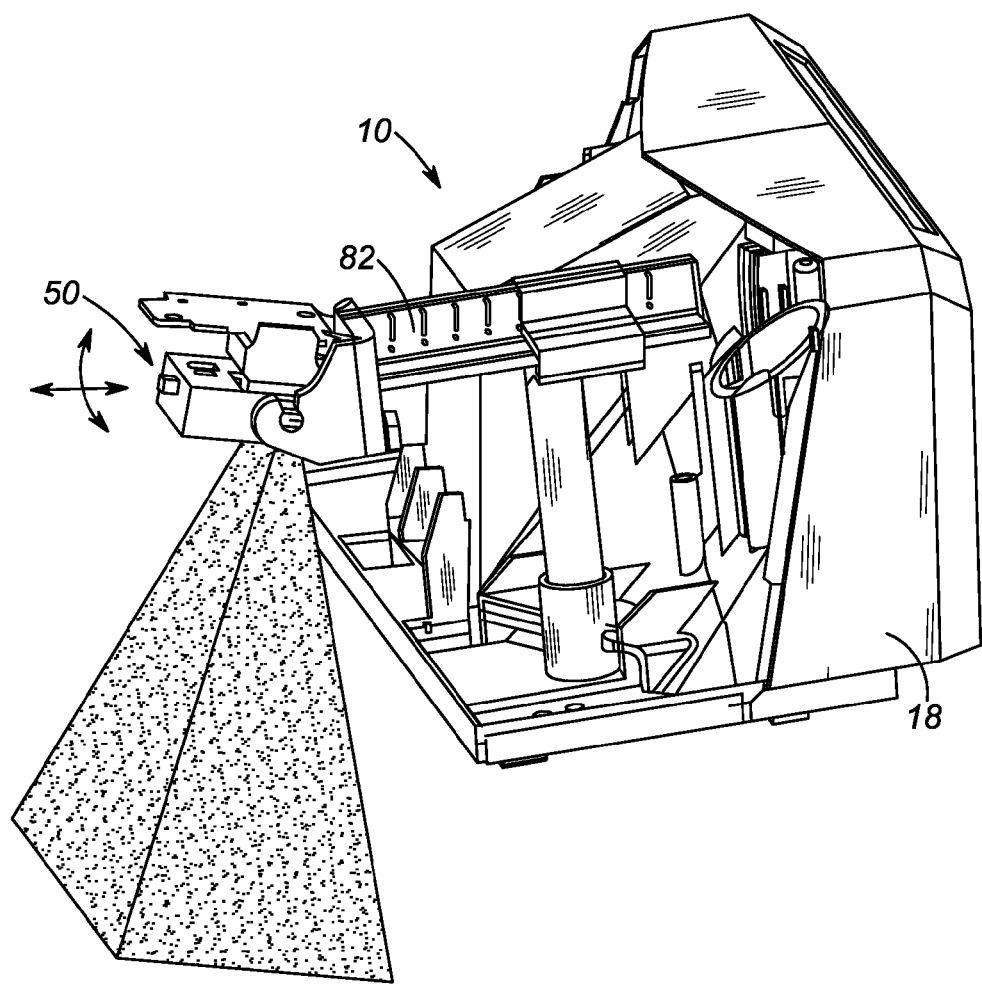
FIG. 10 is a broken-away, rear perspective view of yet another embodiment of a checkout system for processing products associated with targets electro-optically readable by a clerk-operated workstation, and for processing transaction-related items associated with additional targets electro-optically readable by a movable, customer-operated, accessory reader supported by the workstation in accordance with this disclosure.

In yet another embodiment, as shown in FIG. 10, the accessory reader 50 is rearwardly mounted on the workstation 10 with an elongated, telescoping arm 82 for linear movement toward and away from a rear of the workstation 10. The speckled area in FIG. 10 denotes the field of view of the accessory imager in the accessory reader 50. The telescoping arm 82 may also have detents spaced lengthwise thereof for locking the accessory reader 50 in a selected one of the detents.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

For example, the workstation 10 need not be imager-based, but could instead be laser-based. An imager-based workstation need not have the configuration depicted in FIG. 3, but instead could have one or more imagers, each having a field of view split by optical splitters and by a plurality of fold mirrors into a plurality of subfields for greater coverage.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A checkout system, comprising:
a bi-optical workstation operated by a clerk, the bi-optical workstation including a base housing portion underneath a horizontal plate and a raised housing portion above the horizontal plate, the workstation having a first workstation window on the horizontal plate and located in a generally horizontal plane, and the workstation having a second workstation window on the raised housing portion and located in a generally upright plane that intersects the generally horizontal plane, both of the workstation windows facing and being accessible to the clerk for enabling the clerk to pass products to be checked out in a transaction through the workstation, the workstation having a data capture arrangement for capturing through at least one of the workstation windows target data of targets associated with the products to be checked out by the clerk; and
an accessory reader operated by a customer, the accessory reader having an accessory window and a data capture assembly for capturing through the accessory window additional target data of additional targets associated with items related to the transaction, the accessory reader being supported by the workstation for movement relative to the workstation to enable the customer to readily position and aim the accessory window at the additional targets, and the accessory reader being rearwardly mounted on the raised housing portion of the workstation.

2. The system of claim 1, wherein the data capture arrangement at the workstation includes at least one solid-state workstation imager for capturing through at least one of the workstation windows an image of the target data, and a workstation microprocessor operatively connected to the at least one imager for processing the image of the target data.

3. The system of claim 1, wherein the data capture assembly at the accessory reader includes at least one solid-state accessory imager for capturing through the accessory window an image of the additional target data over a range of working distances; and an accessory microprocessor operatively connected to the accessory imager for processing the image of the additional target data.

4. The system of claim 1, wherein the accessory reader is rearwardly mounted on the workstation with an elongated, jointed, hollow, flexible arm that is bendable into a curved shape, and that maintains the curved shape until bent again, wherein one end of the flexible arm is connected to the accessory reader, and wherein an opposite end of the flexible arm is connected to a raised housing portion of the workstation with at one joint elevated from the horizontal plate and with said at one joint on the raised housing portion.

5. The system of claim 1, wherein the accessory reader is rearwardly pivotally mounted on the workstation with an elongated, rigid arm for pivoting movement about an upright axis, wherein one end of the rigid arm is connected to the accessory reader, and wherein an opposite end of the rigid arm is connected to a raised housing portion of the workstation with at one joint elevated from the horizontal plate and with said at one joint on the raised housing portion.

6. The system of claim 1, wherein the accessory reader is rearwardly mounted on the workstation with an elongated, telescoping arm for linear movement toward and away from a raised housing portion of the workstation, wherein one end of the telescoping arm is connected to the accessory reader, and wherein an opposite end of the telescoping arm is connected to the raised housing portion of the workstation with at one joint elevated from the horizontal plate and with said at one joint on the raised housing portion.

7. The system of claim 1, wherein the accessory reader is rearwardly mounted in the raised housing portion of the workstation for turning movement about an upright axis.

8. The system of claim 7, and further comprising a plurality of detents arranged in an arc around the upright axis, and operative for locking the accessory reader in a selected one of the detents.

9. The system of claim 7, and a handle for enabling the customer to turn the accessory reader about the axis.

10. A checkout method, comprising:
configuring a bi-optical workstation with a base housing portion underneath a horizontal plate and a raised housing portion above the horizontal plate;
configuring a bi-optical workstation with a first workstation window on the horizontal plate and located in a generally horizontal plane, and with a second workstation window on the raised housing portion and located in a generally upright plane that intersects the generally horizontal plane;
positioning the workstation windows to face and be accessible to a clerk to enable the clerk to interact and operate the workstation;
capturing through at least one of the workstation windows target data of targets associated with products to be checked out by the clerk in a transaction, by passing the products through the workstation;
configuring an accessory reader with an accessory window;
enabling a customer to interact with and operate the accessory reader;
capturing through the accessory window additional target data of additional targets associated with items related to the transaction; and
supporting the accessory reader by the workstation for movement relative to the workstation to enable the customer to readily position and aim the accessory window at the additional target, and said supporting the accessory reader including rearwardly mounting the accessory reader on the raised housing portion of the workstation.

11. The method of claim 10, wherein the capturing of the target data by the workstation is performed by capturing an image of the target data, and by processing the image of the target data.

12. The method of claim 10, wherein the capturing of the additional target data by the accessory reader is performed by capturing an image of the additional target data over a range of working distances, and by processing the image of the additional target data.

13. The method of claim 10, wherein the supporting is performed by rearwardly mounting the accessory reader on the workstation with an elongated, jointed, hollow, flexible arm, bending the flexible arm into a curved shape, maintaining the curved shape until the flexible arm is bent again, connecting one end of the flexible arm to the accessory reader, and connecting an opposite end of the flexible arm to a raised housing portion of the workstation.

14. The method of claim 10, wherein the supporting is performed by rearwardly mounting the accessory reader on the workstation with an elongated, rigid arm for pivoting movement about an upright axis, connecting one end of the rigid arm to the accessory reader, and connecting an opposite end of the rigid arm to a raised housing portion of the workstation.

15. The method of claim 10, wherein the supporting is performed by rearwardly mounting the accessory reader on the workstation with an elongated, telescoping arm for linear movement toward and away from a raised housing portion of the workstation, connecting one end of the telescoping arm to the accessory reader, and connecting an opposite end of the telescoping arm to the raised housing portion of the workstation.

16. The method of claim 10, wherein the supporting is performed by rearwardly mounting the accessory reader in the raised housing portion of the workstation for turning movement about an upright axis.

17. The method of claim 16, and further comprising arranging a plurality of detents in an arc around the upright axis, and locking the accessory reader in a selected one of the detents.

18. The method of claim 16, and enabling the customer to turn the accessory reader about the upright axis with a handle.

* * * * *